Patented Sept. 18, 1945

2,384,889

UNITED STATES PATENT OFFICE 2,384,889

ALPHA-CHLOROACRYLONITRILE AND
METHOD OF PREPARING THE SAME

Albert M. Clifford, Stow, and James D. D'Ianni, Akron, Ohio, assignors to Wingfoot Corporation, Wilmington, Del., a corporation of Delaware No Drawing. Application March 15, 1940,
Serial No. 324,146

8 Claims. (Cl. 260—464)

This invention relates to new compositions of matter of unsaturated nature and to a method of preparing the same. More particularly, it relates to chlorinated acrylonitriles.

Numerous unsaturated compounds have been proposed and used for polymerizations resulting in plastic masses, useful for lacquers and the like, and, among these, many derivatives of acrylic acid have been suggested. In particular, acrylonitrile has been copolymerized with butadiene or other monomer to yield rubber-like compositions. It has now been found that chlorinated acrylonitrile is especially suitable for polymerization and yields polymers of varying properties.

Alpha-chloroacrylonitrile has the formula $CH_2=CCl-CN$ and is a liquid boiling at about 44° C. under 150 mm. pressure. Direct chlorination of acrylonitrile in solution does not yield the alpha mono chlorinated compound but, instead, tends to produce beta-chloropropionitrile and trichloropropionitrile. In the instant process, chlorination is caused to proceed until a large quantity of the trichloro compound, alpha, alpha, beta-trichloropropionitrile, is obtained and this substance is then dehalogenated by effective means to leave the monochloro compound. The reactions involved are the following:

$$CH_2=CH-CN+2Cl_2 \rightarrow ClCH_2-CCl_2-CN+HCl$$
$$ClCH_2-CCl_2-CN \rightarrow CH_2=CCl-CN+Cl_2$$

The dehalogenation must be conducted with care and it has been found that the reaction is promoted by metals and metallic couples such as zinc, zinc-copper, iron, tin, and particularly, a mixture of magnesium and iodine, $Mg-MgI_2$, these materials being employed in the presence of a solvent. The magnesium-magnesium iodide dehalogenating agent is prepared by reacting a considerable excess of magnesium metal with elementary iodine in a suitable solvent containing a reducing agent. Thus, about five to ten equivalents of magnesium are reacted with one equivalent of iodine in butyl ether, or other solvent, containing a small quantity of hydroquinone.

The preparation of the alpha-chloroacrylonitrile starts with the trichloropropionitrile which can be prepared by bubbling chlorine into acrylonitrile at approximately room temperature. Under such conditions, there is an excellent conversion of the acrylonitrile to trichloropropionitrile. Dehalogenation is conducted at temperatures between about 100° and 200° C. and preferably at about 150° C.

To illustrate the invention, the following example is given in which the trichloropropionitrile, prepared as above, or by other methods, is converted to the desired product. The dehalogenating agent is first prepared by reacting 29 grams of magnesium metal with 51 grams of iodine in 350 cc. of butyl ether containing from ½ to 1 gram of hydroquinone. After the iodine color disappears, the flask containing the agent is heated in an oil bath at 150° C. while 95 grams of alpha, alpha, beta-trichloropropionitrile is added dropwise in 30–45 minutes, while stirring. An exothermic reaction takes place with the removal by distillation of the lower boiling product with butyl ether. Stirring and heating is continued after the addition is made until about 250 cc. of distillate has been obtained. This is shaken with mercury to remove free iodine and is then fractionated. In this way there was obtained 20.5 grams, or 40%, of alpha-chloroacrylonitrile, having a boiling point, when redistilled, of 85–88° C. The refractive index was $N_D^{32}$ 1.4205 and the density was

It will be apparent that the conditions prescribed in the foregoing example may be varied as to temperature, time and methods of purification, without departing from the scope of the invention. Likewise, other metallic dehalogenating agents than those mentioned may be used and the $Mg-MgI_2$ dehalogenating agent may be prepared by other means than those described, provided only that the agent contains considerably more magnesium than iodine, a ratio of 5:1 being suitable, but this being subject to some variation, a 10:1 ratio also being effective.

The alpha-chloroacrylonitrile was subjected to polymerizing conditions to test its utility in the formation of useful compositions. To this end, a copolymer with butadiene was formed by treating a mixture of 40% of the nitrile and 60% of butadiene in an emulsion containing the following additional ingredients:

| | | |
|---|---|---|
| $NaBO_3.4H_2O$ | grams | 0.144 |
| $CCl_4$ | do | 0.48 |
| 5% Aquarex D solution | cc | 10 |
| Citrate-phosphate buffer | cc | 10 |

The results obtained were as follows:

| Buffer | Temp. | Time | Yield |
|---|---|---|---|
| pH 7.0 | ° C. 50 | Hours 27 | Per cent 60.9 |

The above polymerization was carried out with butadiene but the chloroacrylonitrile was also polymerized alone and with other unsaturated compounds. Thus, the nitrile and one or two or more of the following materials may be mixed and copolymerized in an emulsion such as that described above or a similar emulsion. Temperatures from room temperature up to as high as 80° C. may be used for the polymerization with butadiene or for any of the other monomeric mixtures, a temperature in the neighborhood of 50° C. being preferred. The other monomers which may be combined with the alpha-chloroacrylonitrile include these:

Isoprene
Dimethyl butadiene
Styrene
Chlorobutadiene
Vinyl naphthalene
Vinyl furane
Esters of acrylic and methacrylic acid
Vinyl methyl ketone
Methyl isopropenyl ketone
Cyanobutadiene
Acrylonitrile
Methacrylonitrile
Phenyl butadiene
Methyl-1,3-pentadiene
Vinyl ethers
Chlorostyrenes
Alkyl styrenes While there has been described above the preferred embodiment of the invention, it will be apparent that various changes and modifications may be made therein without departing from the spirit of such invention. Accordingly, the invention is to be limited only by the appended claims in which it is intended to set forth all features of patentable novelty residing therein.

What we claim is:

1. As a new composition of matter, alpha-chloroacrylonitrile.

2. A method of preparing alpha-chloroacrylonitrile which comprises heating alpha, alpha, beta-trichloropropionitrile in the presence of a solvent and a metallic dehalogenating agent until two atoms of chlorine per mol of propionitrile have been removed and recovering the alpha-chloroacrylonitrile.

3. A method of preparing alpha-chloroacrylonitrile which comprises heating alpha, alpha, beta-trichloropropionitrile in the presence of a mixture of magnesium and magnesium iodide and a solvent until two atoms of chlorine per mol of propionitrile have been removed and recovering alpha-chloroacrylonitrile.

4. A method of preparing alpha-chloroacrylonitrile which comprises heating alpha, alpha, beta-trichloropropionitrile in a solvent in intimate contact with magnesium-magnesium iodide to a temperature in the neighborhood of 150° C., distilling, treating with mercury to remove iodine and purifying.

5. A method of preparing alpha-chloroacrylonitrile which comprises heating alpha, alpha, beta-trichloropropionitrile in intimate contact with the reaction product of magnesium and less than its molecular equivalent of iodine to a temperature between about 100° and 200° C., distilling and purifying the product.

6. A method of preparing alpha-chloroacrylonitrile which comprises heating alpha, alpha, beta-trichloropropionitrile in intimate contact with a mixture of magnesium and magnesium iodide containing approximately 5 to 10 mols of magnesium to one molecule of magnesium oxide until two atoms of chlorine per mol of propionitrile have been removed and recovering alpha-chloroacrylonitrile.

7. A method of preparing alpha-chloroacrylonitrile which comprises heating alpha, alpha, beta-trichloropropionitrile in the presence of a solvent and a metallic dehalogenating agent to a temperature between about 100° and 200° C.

8. A method of preparing alpha-chloroacrylonitrile which comprises heating alpha, alpha, beta-trichloropropionitrile in the presence of a solvent and a dehalogenating agent to a temperature between about 100° and 200° C.

ALBERT M. CLIFFORD.
JAMES D. D'IANNI.